US007260270B2

(12) United States Patent
Kusaka

(10) Patent No.: US 7,260,270 B2
(45) Date of Patent: Aug. 21, 2007

(54) IMAGE CREATING DEVICE AND IMAGE CREATING METHOD

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 443 days.

(21) Appl. No.: 10/148,338

(22) PCT Filed: Sep. 27, 2001

(86) PCT No.: PCT/JP01/08423

§ 371 (c)(1),
(2), (4) Date: May 29, 2002

(87) PCT Pub. No.: WO02/28091

PCT Pub. Date: Apr. 4, 2002

(65) Prior Publication Data

US 2003/0002746 A1    Jan. 2, 2003

(30) Foreign Application Priority Data

Sep. 28, 2000    (JP)    ............................. 2000-295767

(51) Int. Cl.
*G06K 9/40*    (2006.01)
*H04N 5/225*    (2006.01)
*H04N 9/04*    (2006.01)

(52) U.S. Cl. .................. 382/275; 348/207.99

(58) Field of Classification Search ................ 382/106, 382/107, 173–180, 275, 171, 255; 354/400
See application file for complete search history.

(56) References Cited

U.S. PATENT DOCUMENTS 4,517,599 A * 5/1985 Zwirn et al. ................ 348/625
4,760,385 A * 7/1988 Jansson et al. ............. 345/641
4,876,602 A * 10/1989 Zwirn et al. ................ 348/625

(Continued)

FOREIGN PATENT DOCUMENTS

JP    A 62-127976    6/1987

(Continued)

OTHER PUBLICATIONS

Savakis, A.E. Trussell, H.J., Blur Identification by Residual Spectral Matching, Apr. 1993, Image Processing, IEEE Transactions on, vol. 2, Issue: 2, pp. 141-151.*

(Continued)

*Primary Examiner*—Matthew C. Bella
*Assistant Examiner*—Sath V. Perungavoor
(74) *Attorney, Agent, or Firm*—Oliff & Berridge PLC

(57) ABSTRACT

An image-capturing unit generates an image signal corresponding to an image of a subject formed by a photographing optical system. A point spread function generating unit generates varying point spread functions corresponding to various distances based upon two-dimensional distance distribution information indicating the two-dimensional distance distribution of the subject detected by a distance detection unit and an image blur signal indicating an image blur occurring during the exposure period which is detected by a blur detection unit. An image repair unit divides the image signal into partial images based upon the distance distribution information, executes image processing to repair the blur in the individual partial images by using the point spread functions corresponding to the various distances and creates a whole image by synthesizing the partial images in which the blur has been repaired.

4 Claims, 12 Drawing Sheets

U.S. PATENT DOCUMENTS

| | | | | |
|---|---|---|---|---|
| 4,947,323 | A | * | 8/1990 | Smith .................... 382/132 |
| 4,965,442 | A | * | 10/1990 | Girod et al. ............ 250/201.7 |
| 4,965,840 | A | * | 10/1990 | Subbarao ................. 382/106 |
| 5,061,951 | A | * | 10/1991 | Higashihara et al. ......... 396/95 |
| 5,079,582 | A | * | 1/1992 | Hamada et al. ............ 396/133 |
| 5,130,729 | A | * | 7/1992 | Sato et al. ................. 396/53 |
| 5,140,359 | A | * | 8/1992 | Higashihara et al. ......... 396/95 |
| 5,164,835 | A | * | 11/1992 | Yamada et al. ............ 348/352 |
| 5,166,723 | A | * | 11/1992 | Yoshida et al. ............. 396/52 |
| 5,193,124 | A | * | 3/1993 | Subbarao ................. 382/255 |
| 5,204,709 | A | * | 4/1993 | Sato ...................... 396/263 |
| 5,266,981 | A | * | 11/1993 | Hamada et al. ............. 396/55 |
| 5,396,286 | A | * | 3/1995 | Ishizuka ................ 348/208.6 |
| 5,402,197 | A | * | 3/1995 | Okano et al. .............. 396/55 |
| 5,479,236 | A | * | 12/1995 | Tanaka .................... 396/55 |
| 5,598,242 | A | * | 1/1997 | Omi et al. ................. 396/55 |
| 5,598,246 | A | * | 1/1997 | Miyamoto et al. ........... 396/55 |
| 5,649,237 | A | * | 7/1997 | Okazaki ................... 396/55 |
| 5,682,556 | A | * | 10/1997 | Iwane et al. ............... 396/55 |
| 5,708,863 | A | * | 1/1998 | Satoh et al. ............... 396/52 |
| 5,708,864 | A | * | 1/1998 | Katayama et al. ........... 396/53 |
| 5,710,829 | A | * | 1/1998 | Chen et al. ............... 382/173 |
| 5,790,709 | A | * | 8/1998 | Kopeika et al. ............ 382/254 |
| 5,815,748 | A | * | 9/1998 | Hamamura et al. .......... 396/104 |
| 5,857,122 | A | * | 1/1999 | Miyamoto et al. ........... 396/55 |
| 6,128,035 | A | * | 10/2000 | Kai et al. ................ 348/208.2 |
| 6,154,574 | A | * | 11/2000 | Paik et al. ............... 382/255 |
| 6,157,733 | A | * | 12/2000 | Swain ..................... 382/154 |
| 6,204,968 | B1 | * | 3/2001 | Hayashi ................... 359/557 |
| 6,765,618 | B1 | * | 7/2004 | Sato ...................... 348/348 |
| 2002/0156821 | A1 | * | 10/2002 | Caron ..................... 708/315 |

FOREIGN PATENT DOCUMENTS

| JP | A 11-27574 | 1/1999 |
|---|---|---|
| JP | A 11-134481 | 5/1999 |
| JP | A 11-261797 | 9/1999 |
| JP | A 2001-197355 | 7/2001 |
| JP | A 2001-197356 | 7/2001 |

OTHER PUBLICATIONS

Subbarao, M. Gurumoorthy, N., Depth Recovery from Blurred Edges, Jun. 5-9, 1988, Computer Vision and Pattern Recognition, 1988. Proceedings CVPR '88., Computer Society Conference on, pp. 498-503.*

Choy, S.S.O. Yuk-Hee Chan Wan-Chi Siu, New Adaptive Iterative Image Restoration Algorithm, Nov. 13-16, 1994, Image Processing, 1994. Proceedings. ICIP-94., IEEE International Conference, vol. 2, pp. 670-674.*

Ofer Hadar, Z. Adar, A. Cotter, Yitzhak Yitzhaky, and Norman S. Kopeika, "Restoration of images degraded by mechanical vibrations", Proc. SPIE 2221, 431 (1994).*

Ofer Hadar, Moshe Fisher, and Norman S. Kopeika, "Image resolution limits resulting from mechanical vibrations. Part III:numerical calculation of modulation transfer function", Optical Engineering—Mar. 1, 1992—vol. 31, Issue 3, pp. 581-589.*

Ofer Hadar, Itai Dror, and Norman S. Kopeika, "Image resolution limits resulting from mechanical vibrations. Part IV: real-time numerical calculation of optical transfer functions and experimental verification", Optical Engineering—Feb. 1, 1994—vol. 33, Issue 2, pp. 566-578.*

Subbarao, M., Choi, T., Nikzad, A., "Focusing Techniques", Stony Brook Computer Vision Laboratory, Tech. Report 92.09.04, Sep. 4, 1992.*

Hashimoto et al., "Restoration of shift variant blurred image estimating the parameterdistribution of point-spread function", Systems and Computers in Japan, Scripta Technica Journals, New York, US, vol. 26, No. 1, Jan. 1995, pp. 62-72.

* cited by examiner

IMAGE CREATING DEVICE AND IMAGE CREATING METHOD

The disclosure of the following priority application is herein incorporated by reference:
Japanese Patent Application No. 2000-295767 filed Sep. 28, 2000

TECHNICAL FIELD

The present invention relates to an image generating apparatus and an image generating method to be adopted to repair an image, the quality of which has become poorer due to unsteady hand movement or the like, to a blur-free state, through image processing implemented on the image.

BACKGROUND ART

There is a technology known in the related art for repairing an image, the quality of which has deteriorated due to an unsteady hand movement (hereafter referred to as a blurred image) and correcting the original image to a blur-free state. For instance, the image generating apparatus disclosed in Japanese Laid-Open Patent Publication No. S62-127976 expresses the extent of image quality deterioration caused by an unsteady hand movement during the photographing operation through a point spread function and repairs the blurred image based upon the point spread function.

However, the desired results are not always achieved by repairing an image obtained through an actual image-capturing operation with the image generating apparatus described above. For instance, blurs in an image having a plurality of objects present over varying distances within a single image plane and in a close-up image cannot be repaired to a satisfactory degree.

DISCLOSURE OF THE INVENTION

An object of the present invention is to provide an image generating apparatus and an image generating method that enable a successful repair on a blurred image even when the image contains a plurality of subjects present over varying ranges within the image plane or the image is a close-up image.

In order to achieve the object described above, an image generating apparatus according to the present invention comprises an image-capturing unit that captures an image of a subject formed on an image plane by a photographing optical system and generates an image signal, a distance detection unit that detects distance of the subject on the image plane and generates distance information, a blur detection unit that detects a blur occurring during the image-capturing operation at the photographing optical system and generates a blur signal, a point spread function generating unit that generates a point spread function corresponding to the distance based upon the distance information and the blur signal and an image repair unit that forms a repaired image by repairing the image signal using the point spread function.

It is desirable that the distance detection unit detects two-dimensional distance distribution of the subject, divides the subject distance into a plurality of distance zones based upon distance distribution information and calculates a plurality of sets of distance data each representing one of the distance zones. The point spread function generating unit then generates a plurality of point spread functions in correspondence to the plurality of sets of distance data. The image repair unit, in turn, should divide the image signal into a plurality of partial images each corresponding to one of the distance zones, form a plurality of repaired partial images by repairing each partial image with the point spread function corresponding to the specific distance data and form a repaired image by synthesizing the plurality of repaired partial images.

The object described above may instead be achieved through an image generating apparatus according to the present invention which comprises an information readout unit that reads out image information obtained by photographing a subject, distance information indicating the distance of the subject during the photographing operation and blur information indicating a blur occurring during the photographing operation from a recording medium having recorded therein the image information, the distance information and the blur information, a point spread function generating unit that generates a point spread function in correspondence to the distance based upon the distance information and the blur information and an image repair unit that forms a repaired image by repairing the image information with the point spread function.

In order to achieve the object described above, in the image generating method according to the present invention, an image of a subject is formed on a specific image plane, an image signal is generated by capturing the image of the subject formed on the image plane, distance information is generated by detecting the distance of the subject on the image plane, a blur signal is generated by detecting a blur occurring during the image-capturing operation, a point spread function is generated in correspondence to the distance based upon the distance information and the blur signal and a repaired image is formed by repairing the image signal with the point spread function.

The blur detection unit may detect an angular movement of the photographing optical system through which the photographing optical system becomes displaced around the two axes each extending perpendicular to the optical axis. Alternatively, the blur detection unit may detect a parallel movement through which the photographing optical system becomes shifted parallel to the optical axis. Furthermore, the blur detection unit may detect both an angular movement of the photographing optical system through which it becomes displaced around the two axes perpendicular to the optical axis and a parallel movement through which the photographing optical system becomes shifted parallel to the optical axis to generate a blur signal based upon the angular movement and the parallel movement, instead.

It is desirable that the information readout unit be capable of electronically reading out the image information, the distance information and the blur information recorded in the recording medium. As an alternative, the information readout unit may read out the image information, the distance information and the blur information recorded on silver halide film with a scanner.

As described above, in the image generating apparatus and the image generating method according to the present invention, the distance or the distance distribution of the subject on the image plane is detected and a point spread function (point spread functions) corresponding to the distance or the distance distribution is generated. Since a blurred image is repaired by utilizing the optimal point spread function corresponding to the distance or the distance distribution, the blurred image can be repaired successfully. In particular, the present invention is highly effective in repairing a blur in an image obtained through a close-up photographing operation which tends to be greatly affected by an unsteady hand movement.

BEST MODE FOR CARRYING OUT THE INVENTION

The extent to which an image becomes blurred due to an unsteady hand movement or the like varies depending upon the subject distance, and the blur becomes drastically pronounced as the distance of the subject becomes shorter. In the blurred image repair technology achieved in the related art, a uniform hypothetical point spread function (blurring extent) is used to repair a blurred image without taking into consideration the subject distance. For this reason, a blur in an image having a plurality of objects present over varying distances within a single image plane or in a close-up image cannot be fully repaired. Accordingly, in the image generating apparatus according to the present invention, a blurred image is repaired based upon a point spread function set in conformance to the distance. The term "point spread function" used in this context refers to a function that indicates the intensity distribution of point images blurred by a movement.

Figure 1:
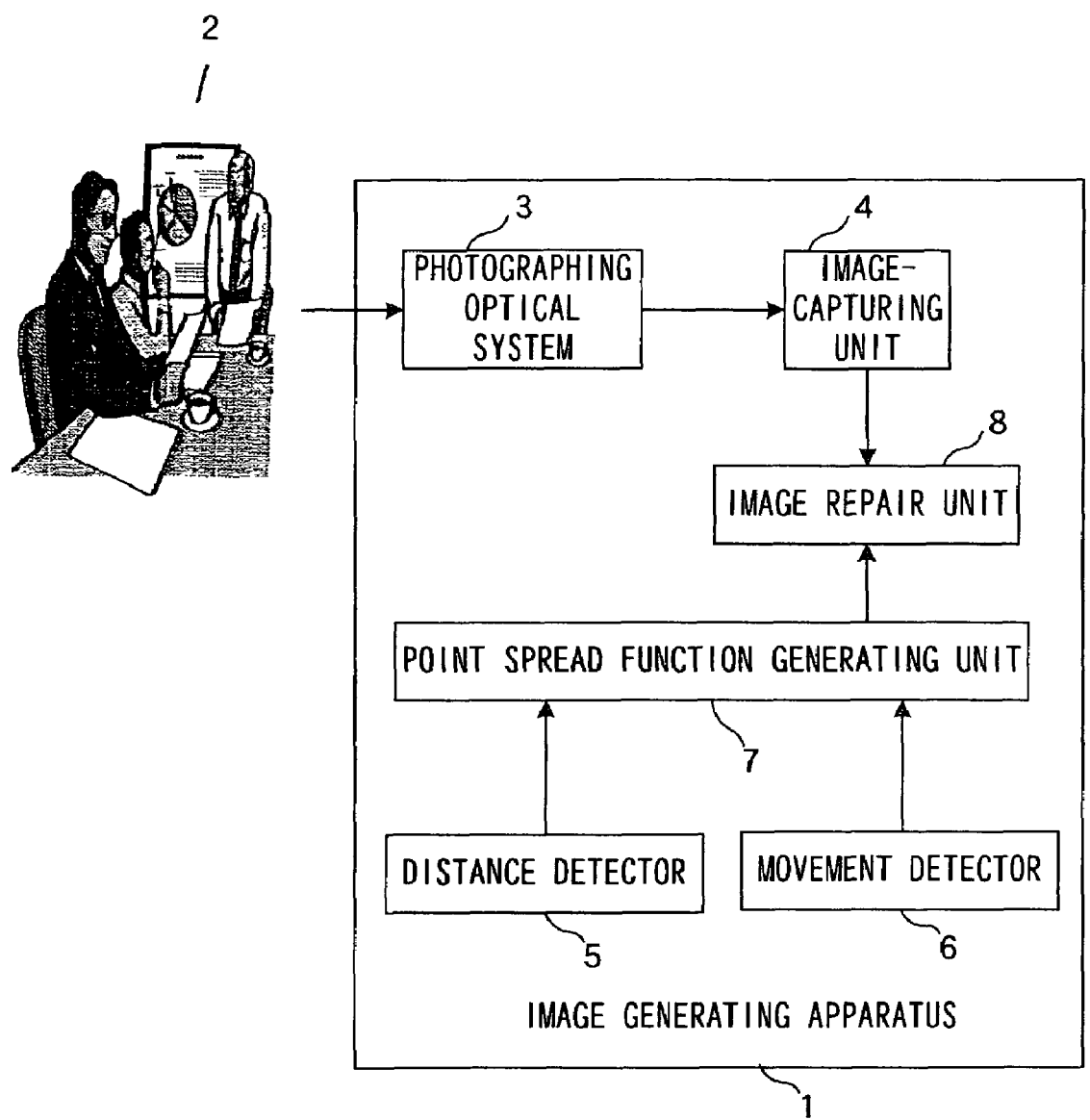
FIG. 1 is a block diagram of the structure assumed in an embodiment of the image generating apparatus according to the present invention.

FIG. 1 presents a block diagram illustrating the concept of the image generating apparatus achieved in an embodiment of the present invention. An image generating apparatus 1 according to the present invention comprises a photographing optical system 3, an image-capturing unit 4, a distance detector 5, a blur detector 6, a point spread function generating unit 7 and an image repair unit 8.

The photographing optical system 3 forms an image of a subject 2 on a specific image plane. The image-capturing unit 4 is constituted of a solid image-capturing element such as a CCD or a CMOS that captures the image of subject 2 formed on the specific image plane and a control circuit for the solid image-capturing element. The control circuit controls the length of exposure time (the length of time over which electrical charges are stored) to elapse at the solid image-capturing element in correspondence to the brightness level of the subject image and generates an image signal corresponding to the image of the subject 2.

The distance detector 5 is constituted of a distance detection device of the known art. The distance detector 5 detects a two-dimensional distance distribution of the subject 2 formed on the specific image plane and thus generates distance distribution information. The blur detector 6 detects the movement of the photographing optical system 3 occurring during an image-capturing operation at the image-capturing unit 4 and generates a blur signal which changes over time. The blur detector 6 may be constituted of, for instance, an angular speed sensor.

The point spread function generating unit 7 generates a point spread function which changes in correspondence to the distance, based upon the distance distribution information with regard to the subject 2 and the blur signal input from the distance detector 5 and the blur detector 6 respectively.

The image repair unit 8 executes image processing on the image signal (the blurred image signal) generated by the image-capturing unit 4, the quality of which has been lowered by an unsteady hand movement, in conformance to the distance distribution information by using the point spread function generated by the point spread function generating unit 7 and thus generates an image signal with its image quality, which has been compromised by the unsteady hand movement, restored.

Figure 2:
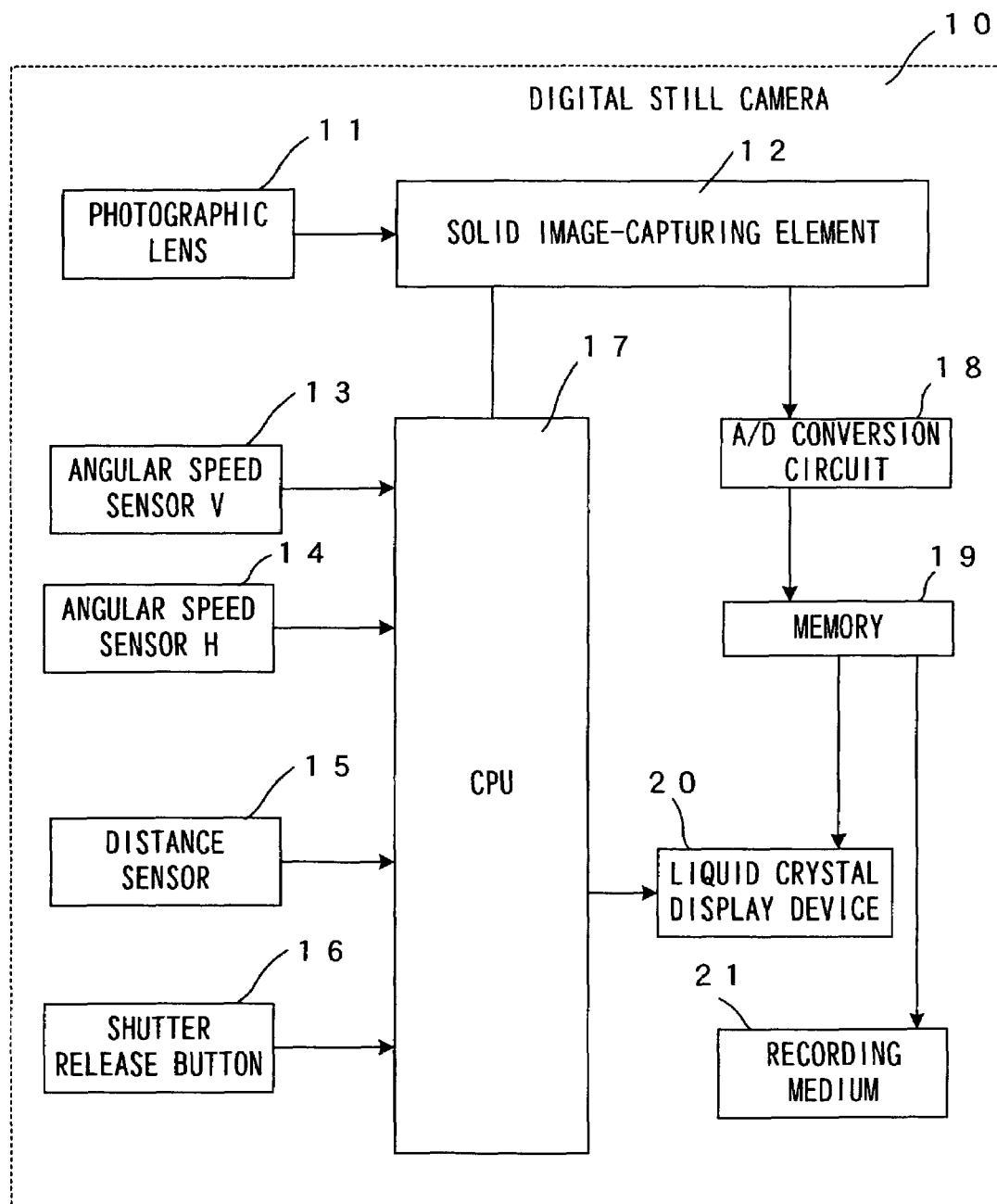
FIG. 2 is a block diagram of the structure assumed in a digital camera adopting the present invention.

FIG. 2 is a block diagram of the structure assumed in a digital still camera 10 adopting the image generating apparatus according to the present invention. The following is a detailed explanation of the image generating apparatus and the image generating method according to the present invention, given in reference to FIG. 2.

A subject image formed by a photographic lens 11 undergoes a photoelectric conversion at a charge-storage type solid image-capturing element 12 such as a CCD and, as a result, an image signal is output. The image signal is converted to a digital image signal at an A/D conversion circuit 18 and is stored in a volatile memory 19 which may be a RAM. The image constituted of the image signal stored in the memory 19 is displayed at a liquid crystal display device 20 and the image signal is also recorded into a nonvolatile recording medium 21 such as a compact flash memory. A CPU (central processing control unit) 17 controls the image-capturing operation, the storage operation, the display operation and the recording operation described above.

An angular speed sensor V13 and an angular speed sensor H14 are blur detection sensors provided to detect movement (vibration) of the digital still camera 10. The angular speed sensor V13 and the angular speed sensor H14 perform real-time detection of the angular speeds around two axes both extending perpendicular to the optical axis of the photographic lens 11 and also extending perpendicular to each other. Their detection outputs are provided to the CPU 17 as angular speed signals.

A distance sensor 15 is a sensor provided to detect the two-dimensional distance distribution of the subject. The distance sensor 15 is to be described in detail later.

A shutter release button 16, which is a member operated by the photographer to take a photograph, generates a shutter release signal in response to the photographer operation.

It is to be noted that an optical viewfinder (not shown) is provided at the digital still camera 10. The photographer is able to observe the subject through the optical viewfinder (not shown).

The CPU 17 calculates the extent to which the photographic lens 11 is displaced during the image-capturing operation based upon the angular speed signals provided from the angular speed sensor V13 and the angular speed sensor H14. The CPU 17 also obtains the subject distance distribution information detected by the distance sensor 15. Based upon the blur signal and the distance distribution information, the CPU 17 generates point spread functions in correspondence to various distances.

In addition, it implements the image repair processing to be detailed later on the blurred image signal stored in the memory 19 by using these point spread functions. The repaired image signal is then stored back into the memory 19. The repaired image signal is displayed at the liquid crystal display device 20 in response to the command signal from the CPU 17 and is also recorded into the recording medium 21.

Figure 3:
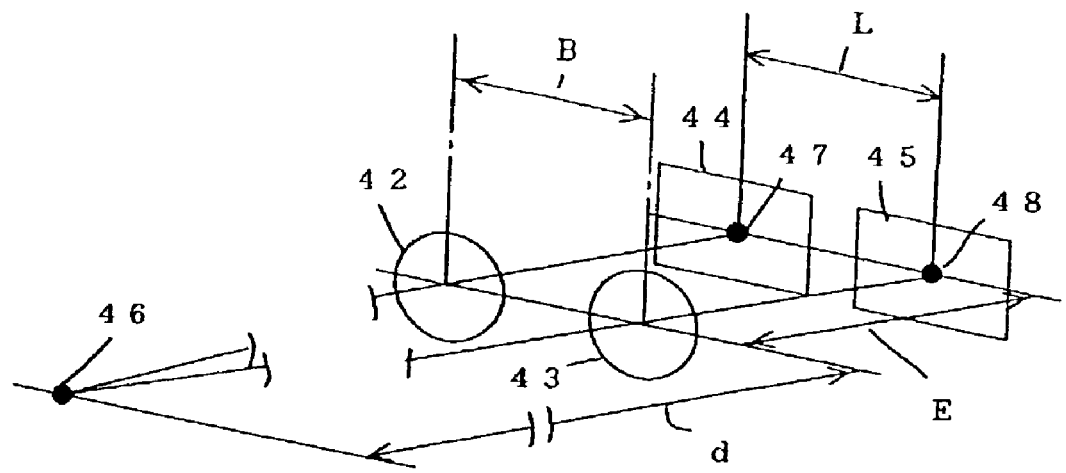
FIG. 3 illustrates the principle of the distance detection.

Now, the distance sensor 15 is explained in detail. FIG. 3 shows the structure of the distance sensor 15. The distance sensor 15 detects the subject distance distribution information indicating the distance distribution of the subject when the shutter release signal is input from the shutter release button 16 to the CPU 17. In this embodiment, the distance sensor 15 receives the subject light flux through an optical system provided separately from the photographing optical system 3.

An image of the subject formed by a range finding lens 42 is captured by a two-dimensional image sensor 44 provided rearward relative to the range finding lens 42 over a distance E from the range finding lens 42. The two-dimensional image sensor 44 generates image data of the subject image. In addition, an image of the subject formed by a range finding lens 43 achieving optical characteristics identical to those of the range finding lens 42 is captured by a two-dimensional image sensor 45 provided rearward relative to the range finding lens 43 over the distance E from the range finding lens 43 and image data of the subject image are generated by the two-dimensional image sensor 45. It is to be noted that the range finding lens 42 and the range finding lens 43 are set apart over a baseline length B from each other.

Figure 4:
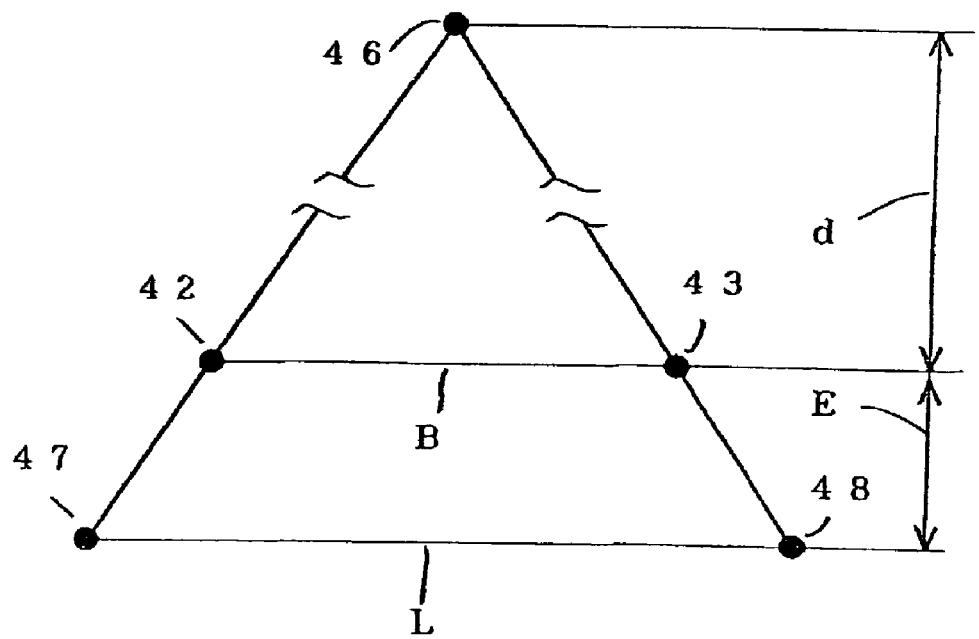
FIG. 4 illustrates the principle of the distance detection.

FIG. 4 shows the relationship between a point 46 set over an unknown distance d from the range finding lenses 42 and 43 and image forming points 47 and 48 on the two-dimensional image sensors 44 and 45 corresponding to the point 46. The distance L between the images formed at the image forming points 47 and 48 is measured based upon the image data generated by the two-dimensional image sensors 44 and 45. The distance d to the point 46 can be determined through the formula in (expression 1) based upon the principle of trigonometric range measurement.

$$d = B \times E/(L-B) \quad \text{(expression 1)}$$

The image plane is divided into a plurality of areas, e.g., 5×10 areas, and the distances to these areas are measured by scanning the range finding points present in the individual areas. As a result, the two-dimensional distance distribution of the subject can be detected. The distance distribution of the subject in the photographic image plane is detected by correlating the image signal from the solid image-capturing element 12 with the image data generated by the two-dimensional image sensors 44 and 45. It is to be noted that if the size of the solid image-capturing element 12 which generates the image signal is different from the size of the two-dimensional image sensors 44 and 45 provided for range finding, the image signal and the image data should be made to correspond to each other through reduction/enlargement, shifting or the like. The subject distance distribution information thus detected is transmitted to the CPU 17.

Figure 5:
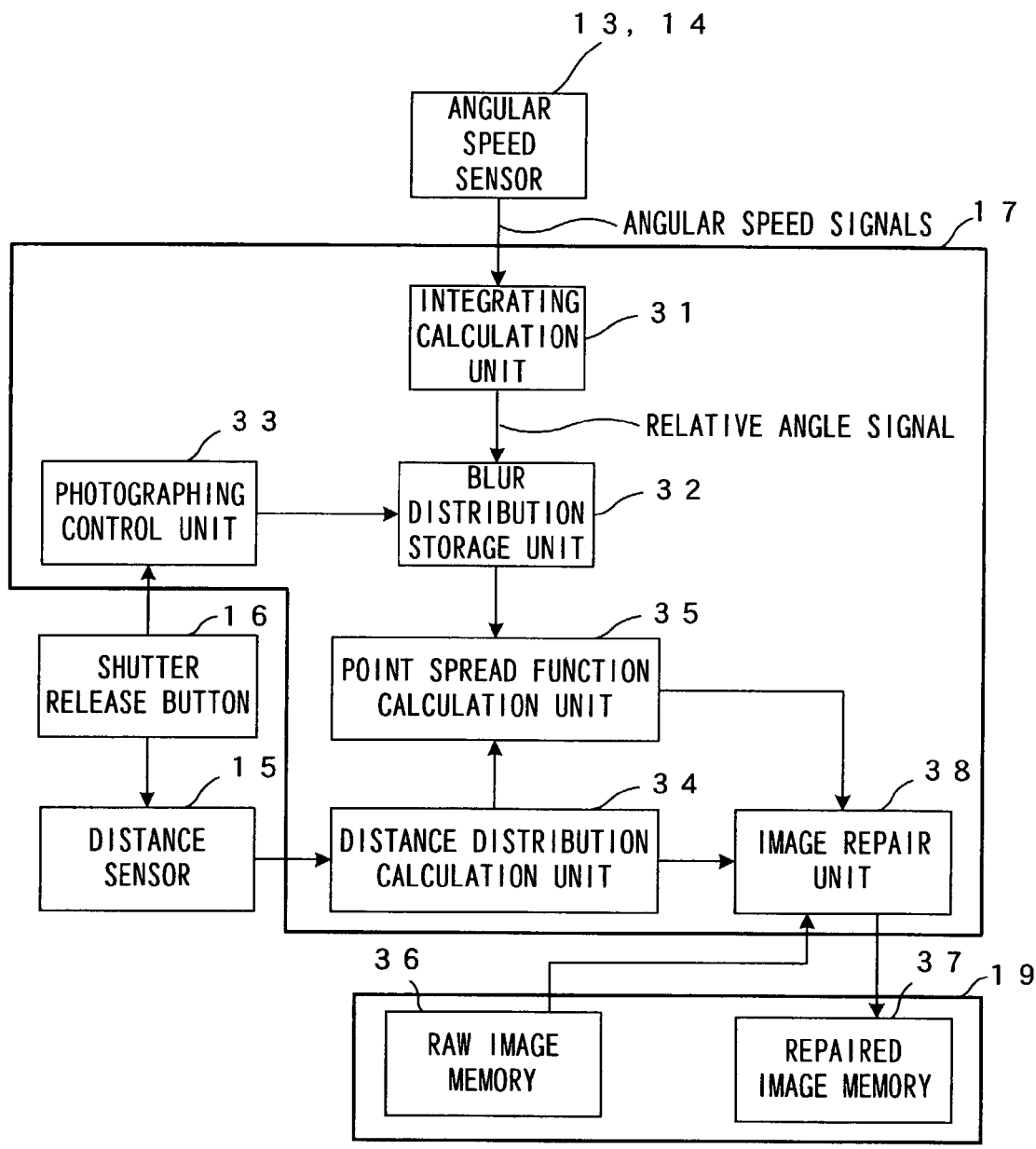
FIG. 5 is a block diagram showing the structure of the CPU and its periphery.

FIG. 5 presents a block diagram showing the structure assumed in the CPU 17 in FIG. 2 and its periphery in further detail. Now, in reference to FIG. 5, the processing executed by the CPU 17 to repair an image signal that has become degraded due to a movement (vibration) is explained in detail. It is to be noted that the CPU 17 in FIG. 5 comprises an integrating calculation unit 31, a blur distribution storage unit 32, a photographing control unit 33, a distance distribution calculation unit 34, a point spread function calculation unit 35 and an image repair unit 38. In addition, the memory 19 is constituted of a raw image memory 36 and a repaired image memory 37.

Figure 6:
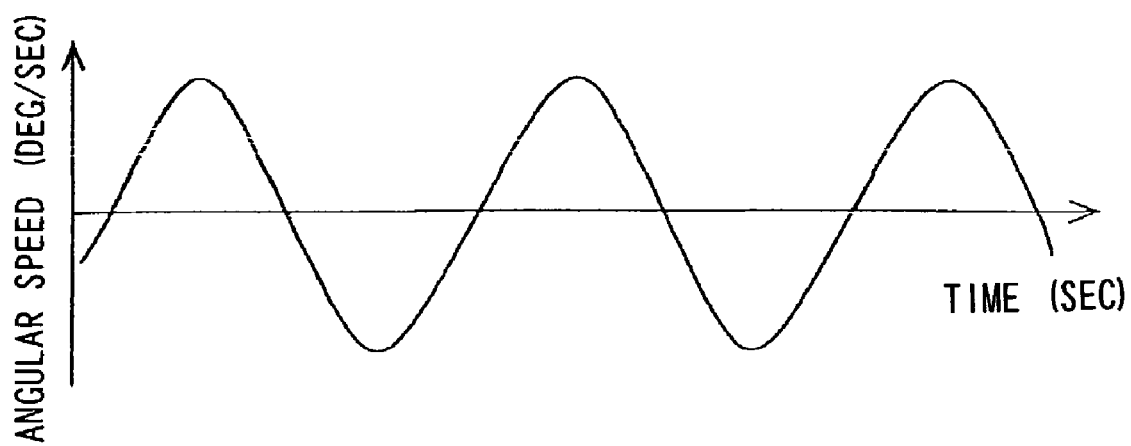
FIG. 6 shows the waveform of an angular speed signal.
Figure 7:
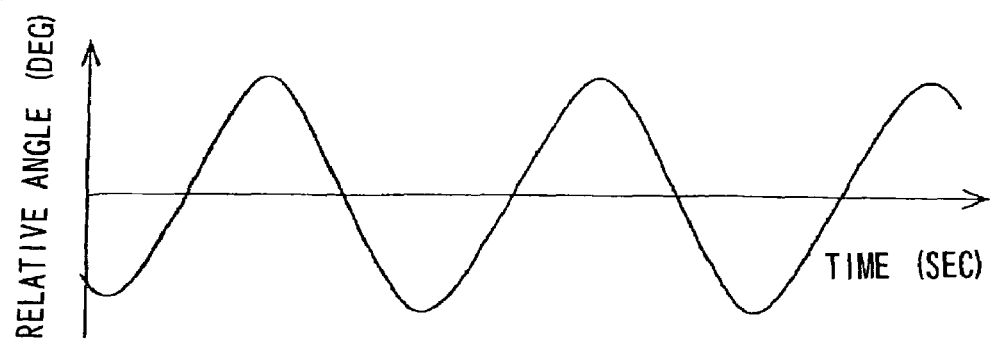
FIG. 7 shows the waveform of a relative angle signal.

Angular speed signals are generated at the angular speed sensor V13 and the angular speed sensor H14 in response to an unsteady hand movement or the like to which the digital still camera 10 is subjected. FIG. 6 shows a one-dimensional angular speed signal generated when the digital still camera 10 is subjected to an unsteady hand movement represented by a sine wave. This angular speed signal undergoes A/D conversion over predetermined sampling intervals and it thus is converted to digital data. The angular speed signal converted to digital data is then converted to a relative angle signal through an integration operation executed at the integrating calculation unit 31. The relative angle signal indicates a relative angular displacement obtained by excluding the integration constant. The relative angle signal thus calculated is transmitted to the blur distribution storage unit 32. FIG. 7 shows the relative angle signal obtained by integrating the relative angular speed signal shown in FIG. 6.

A shutter release signal is provided to the photographing control unit 33 and the distance sensor 15 through the shutter release button 16 in response to an operation of the shutter release button 16 by the photographer. Upon receiving the shutter release signal, the photographing control unit 33 implements control so as to execute an exposure operation at the solid image-capturing element 12 over the exposure period set in conformance to the subject brightness, the sensitivity of the solid image-capturing element 12 and the aperture value at the photographic lens 11. In addition, the photographing control unit 33 transmits an exposure timing signal to the blur distribution storage unit 32. In response to the exposure timing signal, the blur distribution storage unit 32 stores in memory the relative angle signals generated during the exposure period.

Figure 8:
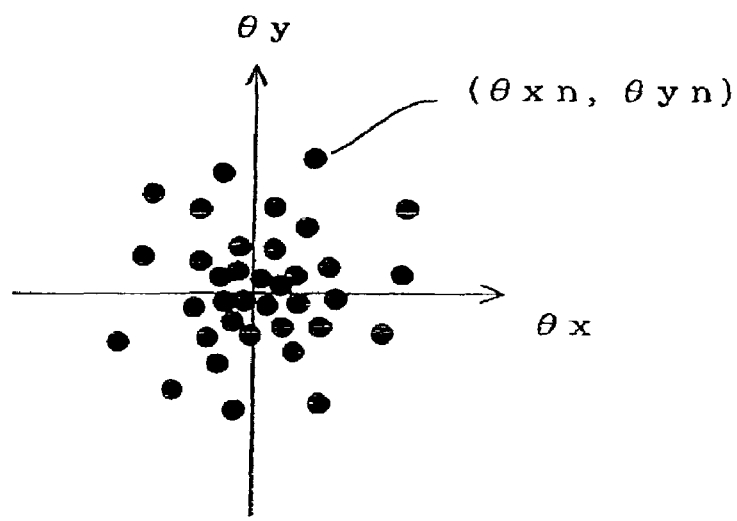
FIG. 8 illustrates the two-dimensional state of the relative angle signal.
Figure 9:
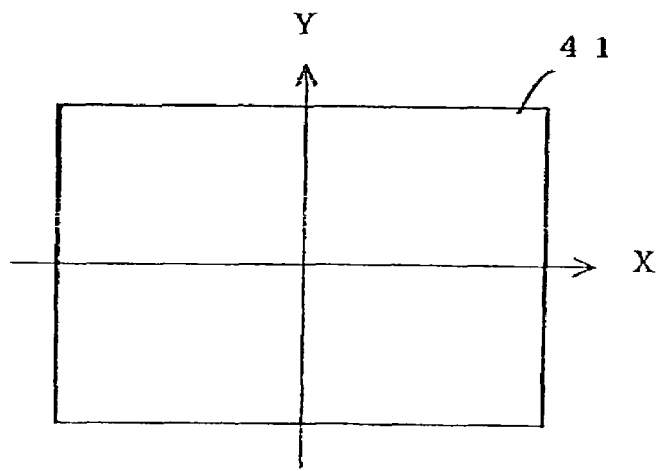
FIG. 9 shows coordinates taken on the photographic image plane.

FIG. 8 illustrates the two-dimensional state of the data constituted of the relative angle signal stored in the blur distribution storage unit 32 as described above. The data values representing the relative angle sampled at the predetermined time intervals during the exposure period are indicated by the filled circles. In FIG. 8, $\theta x$ represents the angle around the X axis and $\theta y$ represents the angle around the Y axis. It is to be noted that the X axis and the Y axis are defined so as to intersect each other perpendicularly in a photographic image plane 41 as shown in FIG. 9. In addition, both the X axis and the Y axis extend perpendicular to the optical axis. The total number of times the relative angle is sampled during the exposure period is N and data obtained from the nth sampling are indicated as (θxn, θyn). The conversion is executed by ensuring that the average of the N sets of relative angle data sampled during the exposure period is (0, 0).

Figure 10:
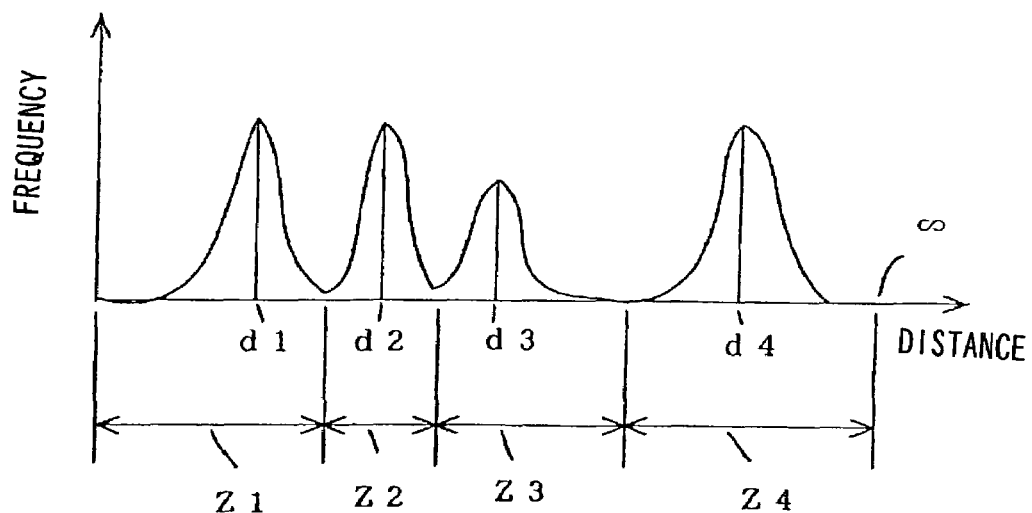
FIG. 10 shows the frequencies with which various distance values are detected on the photographic image plane.

In response to the shutter release signal, the distance sensor 15 measures the distance distribution of the subject to be photographed and provides it to the distance distribution calculation unit 34. Based upon the two-dimensional distance distribution that has been received, the distance distribution calculation unit 34 prepares a histogram such as that shown in FIG. 10 indicating the frequencies with which various distance values appear in the photographic image plane. By using this histogram, the subject distances ranging from a small distance to an infinite distance are divided into a plurality of distance zones in correspondence to the frequencies with which those distances manifest. Then, distance data indicating values each representing one of the divided distance zones are selected. In FIG. 10, the subject distances are divided into distance zones Z1, Z2, Z3 and Z4 respectively represented by distance data d1, d2, d3 and d4. In addition, the distance distribution calculation unit 34 divides the image signal into a plurality of partial images in correspondence to the divided distance zones and obtains position information indicating the positions of the partial images.

Figure 11:
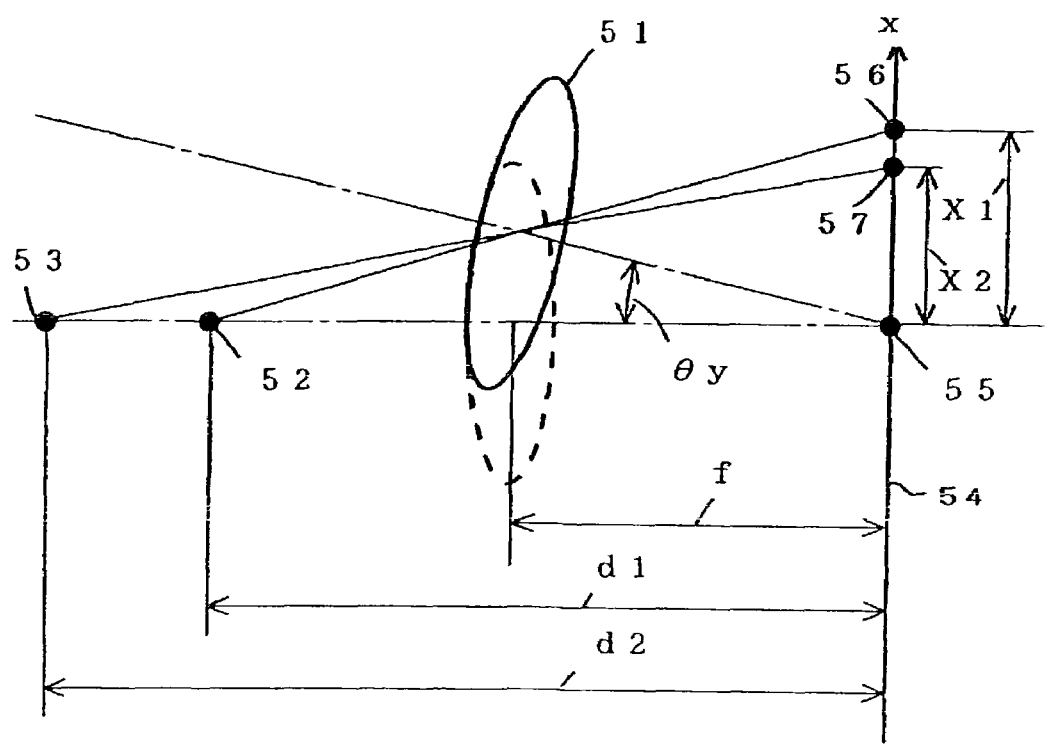
FIG. 11 illustrates the relationship between the angular movement and the image blur manifesting in correspondence to the distance.

At the point spread function calculation unit 35, the relative angle signal (θxn, θyn) stored in the blur distribution storage unit 32 is converted to a signal (Xn, Yn) indicating the extent of image blur manifesting in the image plane based upon the distance data obtained by the distance distribution calculation unit 34. FIG. 11 illustrates the principle of the conversion from the relative angle signal to the image blur signal, which is implemented in correspondence to the distance. For purposes of simplification, the photographing optical system is shown as a single lens 51. The focal length of the lens 51 is f.

Let us consider a situation in which the lens 51 has tilted by an angle θy around the y axis relative to the center 55 of an image plane 54. It is assumed that points 52 and 53 are set on the optical axis over distances d1 and d2 respectively from the image plane 54. Reference numbers 56 and 57 respectively indicate the image points on the image plane corresponding to the points 52 and 53. The extents of image blur occurring with regard to the points 52 and 53 along the x axis on the image plane are equal to distances X1 and X2 of the image points 56 and 57 from the image plane center 55 respectively. The extents X1 and X2 to which the images at the points 52 and 53 become blurred along the x axis on the image plane are respectively calculated through the following formulae in (expression 2).

$$X1 = d1 \times f \times \tan\theta y / (d1-f)$$

$$X2 = d2 \times f \times \tan\theta y / (d2-f) \quad \text{(expression 2)}$$

It is to be noted that the extents Y1 and Y2 of image blur manifesting along the y axis, too, can be calculated through a similar process.

As (expression 2) indicates, the factor of d/(d−f) changes more drastically as the value of the distance d becomes smaller, i.e., as the distance becomes shorter. For this reason, the extent of blurring changes more dramatically as the subject is set closer when the digital camera undergoes a given degree of angular displacement (tilt).

Figure 12:
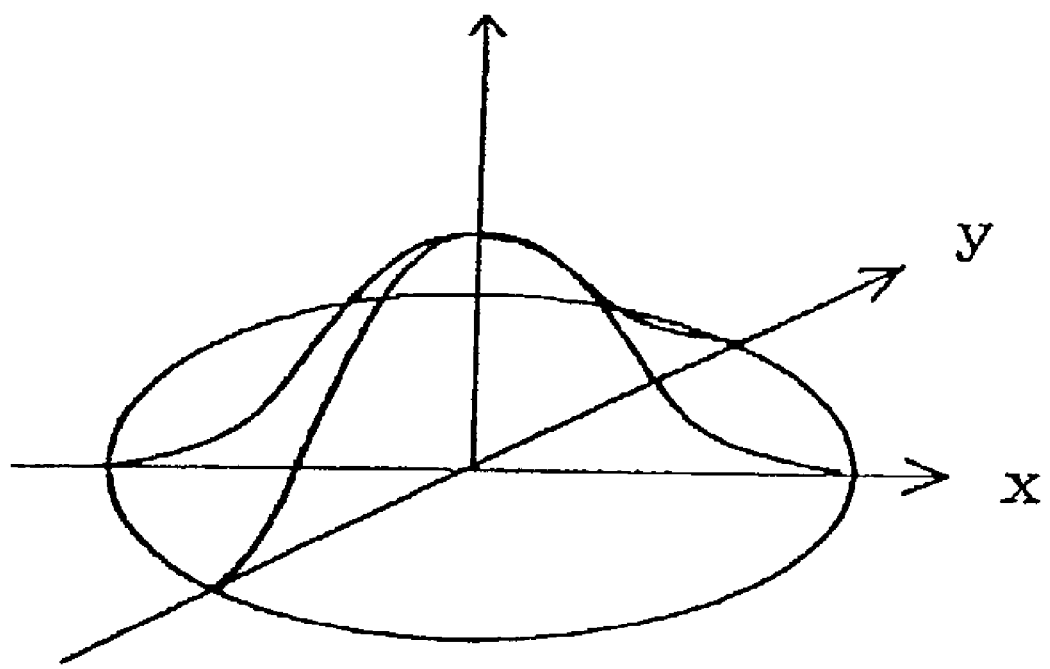
FIG. 12 shows an example of the point spread function.

Using the formulae in (expression 2), the point spread function calculation unit 35 converts the relative angle signals (θxn, θyn) such as those shown in FIG. 8 to image blur signals (X1n, Y1n), (X2n, Y2n) . . . in correspondence to the distance data d1, d2 . . . respectively. Then, the discrete image blur signals (X1n, Y1n), (X2n, Y2n) . . . are converted to continuous point spread functions h1 (x, y), h2 (x, y) . . . shown in FIG. 12 through smoothing or the like.

The image repair unit 38 reads out the image signal having been degraded by a hand movement from the raw image memory 36 where it has been stored. This image information is expressed as functions g1 (x, y), g2 (x, y) . . . The image repair processing is implemented on the functions g1 (x, y), g2 (x, y) . . . of the degraded image signal by using the point spread functions h1 (x, y), h2 (x, y) . . . Furthermore, a repaired image signal is generated through image synthesis processing executed in correspondence to the individual distance zones (z1, z2 . . . ) in the image plane and the repaired image signal is then stored into the repaired image memory 37.

Figure 13:
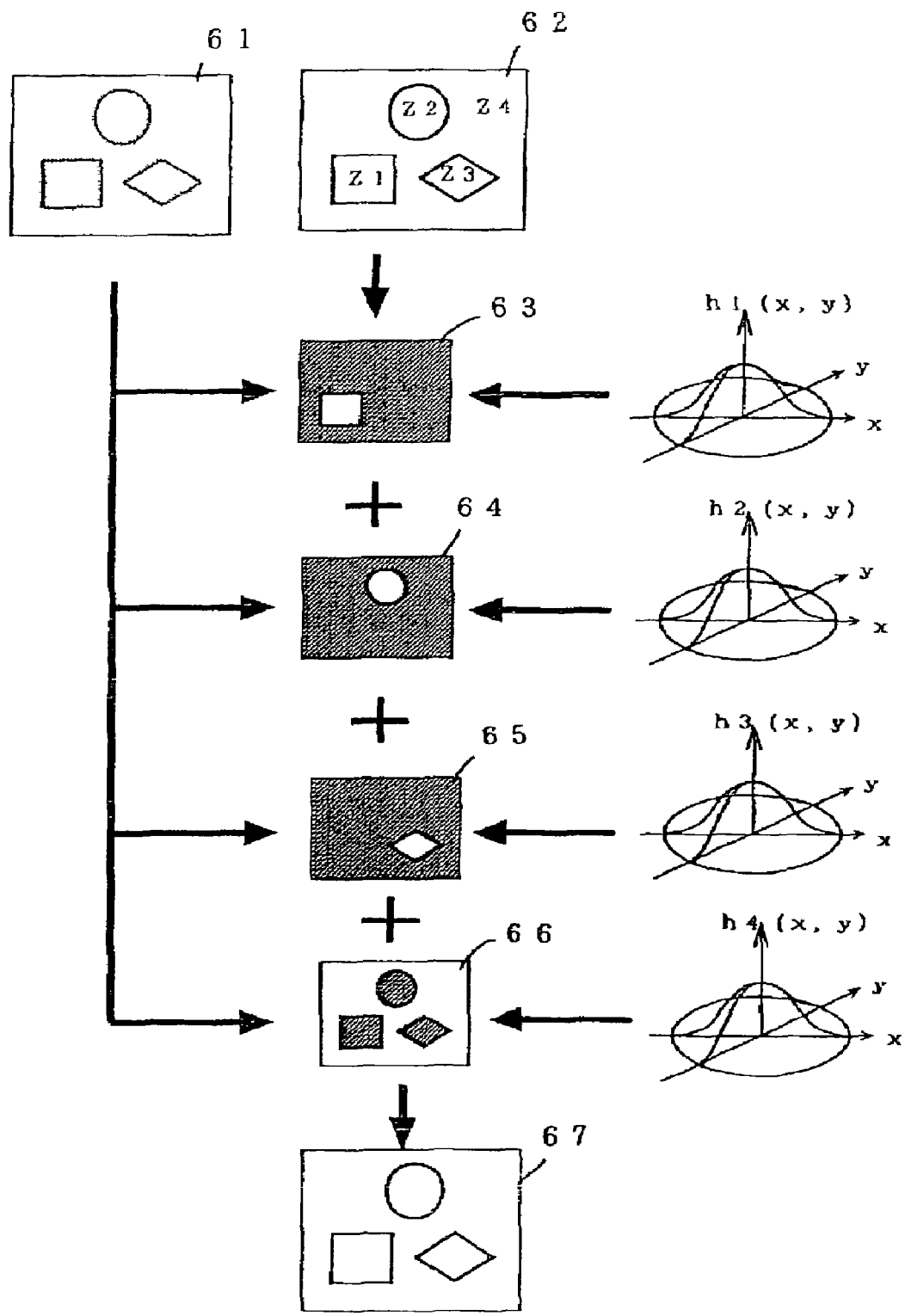
FIG. 13 illustrates the blurred image repair processing implemented in correspondence to distance.

FIG. 13 illustrates the concept of the image repair processing described above. First, position information 62 indicating the positions of the plurality of partial images obtained by dividing an image 61 having become degraded due to a blur into a plurality of portions in correspondence to the individual distance zones (Z1, Z2, Z3 and Z4) and then identified is obtained. Next, the image 61 having become degraded due to a blur individually undergoes image repair processing implemented by utilizing each of the point spread functions h1 (x , y), h2 (x, y), h3 (x, y) and h4 (x, y) determined in correspondence to the distance data (d1, d2, d3 and d4) representing the distance zones (Z1, Z2, Z3 and Z4) respectively. From the repaired images, partial images 63, 64, 65 and 66 corresponding to varying distances are extracted based upon the image position information 62. Finally, the partial images 63, 64, 65 and 66 are synthesized to generate a repaired image 67.

Now, the concept of the image repair processing implemented by using the individual point spread functions h1 (x, y), h2 (x, y) . . . is explained.

A function f (x, y) represents the image information of a blur-free image, a function g (x, y) represents the image information of an image having become degraded due to a blur and a point distribution function h (x, y) represents the image information of a point image which has become blurred due to a movement (vibration). The following relationship in (expression 3) is achieved by these functions f (x, y), g(x, y) and h(x, y).

$$f(x, y) * h(x, y) = g(x, y) \quad \text{(expression 3)}$$

"*" in the expression above is a symbol that indicates a convolution operation. When the two sides of (expression 3) are converted through a Fourier transform, the equation in (expression 4) is true in the frequency range:

$$F(u, v) \times H(u, v) = G(u, v) \quad \text{(expression 4)}$$

The functions G, F and H above are obtained by Fourier transforming the functions g, f and h. u and v respectively represent the frequencies along the x direction and the y direction. By dividing the two sides of (expression 4) by H (u, v), the equation in (expression 5) is obtained.

$$F(u, v) = G(u, v) / H(u, v) \quad \text{(expression 5)}$$

Then, by inverse Fourier transforming (expression 5), a function f (x, y) of the original information from which the blur has been eliminated is obtained as indicated in (expression 6).

$$f(x, y) = S(F(u, v)) = S(G(u, v) / H(u, v)) \quad \text{(expression 6)}$$

In the expression above, S( ) indicates an inverse Fourier transform. By Fourier transforming the image function representing the image having become degraded due to a movement, dividing the resulting function by the function obtained through a Fourier transformation implemented on the blurred point spread function and then by inverse Fourier transforming the results of the division, the function of the original image containing no blur can be obtained.

Figure 14:
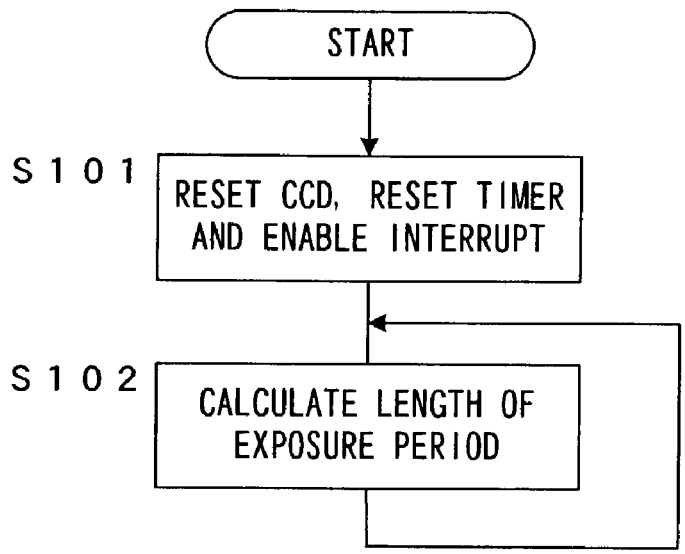
FIG. 14 presents a flowchart of the CPU operation processing.
Figure 15:
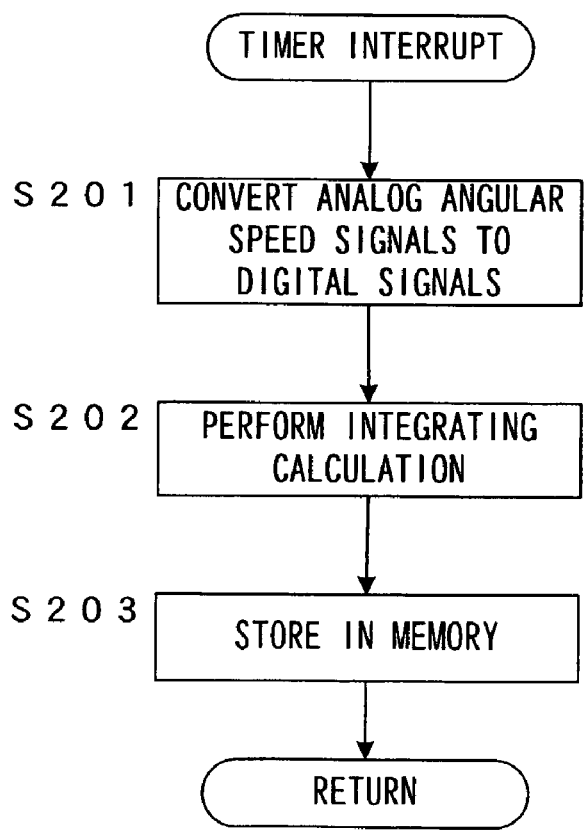
FIG. 15 presents a flowchart of the CPU operation processing.
Figure 16:
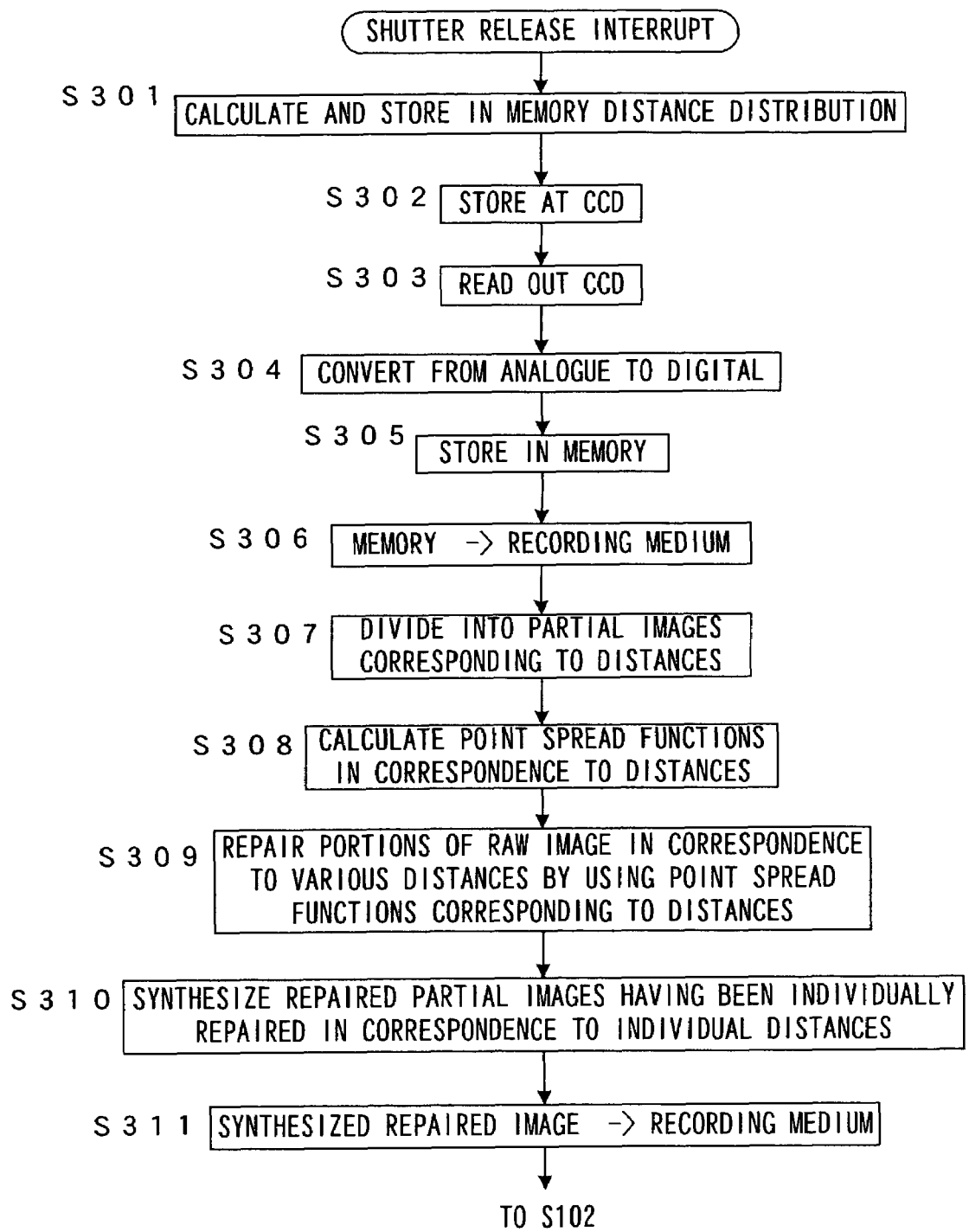
FIG. 16 presents a flowchart of the CPU operation processing.

Next, the processing procedure adopted in the image repair operation program executed by the CPU 17 shown in FIG. 2 is explained in reference to the flowcharts in FIGS. 14~16. It is to be noted that the explanation is given on the assumption that the solid image-capturing element 12 is constituted of a CCD.

FIG. 14 presents a flowchart of the main program executed by the CPU 17. FIG. 15 presents a flowchart of the timer interrupt program executed to convert the analog angular speed signal to digital signal over the predetermined time intervals. FIG. 16 presents a flowchart of the shutter release interrupt program started up in response to a shutter release signal. It is to be noted that the timer interrupt processing program and the shutter release interrupt processing program in FIGS. 15 and 16 are executed by interrupting the execution of the main program shown in FIG. 4 as necessary.

The main program executed by the CPU 17 which is shown in FIG. 14 starts as the power to the digital still camera 10 is turned on. In step S101, the operation of the CCD 12 is reset and also the timer and the like are reset, thereby enabling a subsequent timer interrupt or shutter release interrupt. In step S102, the length of time over which the electrical charges are to be stored (the length of the exposure time) at the CCD 12 is calculated by using information (the subject brightness level, the pixel sensitivity, the aperture value and the like) required when determining the length of the exposure period. Subsequently, the processing in step S102 is executed repeatedly.

The timer interrupt program shown in FIG. 15 which is executed over predetermined time intervals is explained. In step S201, the analog angular speed signals are converted to digital signals and the digitized data are stored into a memory (not shown). In step S202, the angular speed data including the most recent angular speed data stored in the memory are integrated to calculate a relative angle signal. The relative angle signal thus calculated is stored into the memory (not shown) in step S203 before the operation makes a return.

FIG. 16 presents a flowchart of the shutter release interrupt program. This processing is started up as a shutter release signal is input to the CPU 17 in response to an operation of the shutter release button 16.

First, in step S301, the distance distribution information with regard to the subject on the photographic image plane is taken in by the distance sensor 15 and a distance histogram such as that shown in FIG. 10 is prepared. In addition, representative distance data (d1, d2 . . . ) are calculated in correspondence to the individual distance zones (Z1, Z2, . . . ) and the calculated representative distance data are stored in memory. In step S302, the subject image formed by the photographic lens 11 is captured at the CCD 12 over the exposure period the length of which has been calculated in step S102 most recently. In step S303, the image signal stored at the CCD 12 is read out. In step S304, the image signal that has been read out undergoes an A/D conversion, and the image signal having undergone A/D conversion, i.e., the image signal having become degraded due to blurring, is temporarily stored into the memory 19 in step S305. In step S306, the image signal stored in the memory 19 is recorded into the recording medium 21.

In step S307, the image signal is divided into partial images in correspondence to the individual distance zones (Z1, z2, . . . ). In step S308, point spread functions h1 (x, y), h2 (x, y) . . . corresponding to the representative distance data (d1, d2 . . . ) are calculated based upon the relative angle signal stored in the memory (not shown) in step S203 and the representative distance data (d1, d2 . . . ) calculated in step S301 as explained earlier. In step S309, an image repair processing operation is executed by using the point spread functions h1 (x, y), h2 (x, y) . . . corresponding to the representative distance data (d1, d2 . . . ) and also, repaired partial images over the individual divided areas corresponding to the distance zones (Z1, Z2, . . . ) are extracted.

In step S310, the individually repaired partial images are synthesized to generate a whole repaired image. In step S311, the synthesized repaired image is recorded into the recording medium 21 before the operation returns to step S102.

As explained above, the blurred image repair processing is executed by using the optimal point spread functions in correspondence to the various distances and, as a result, a blurred image can be successfully repaired even when there are a plurality of subjects present over varying distances in the image plane or when the image is obtained through a close-up photographing operation.

(Variations of the Embodiment)

The present invention is not limited to the embodiment explained above and it allows for a number of variations and modifications.

While the blurred image is repaired in the embodiment by detecting the two-dimensional distance distribution of the subject and preparing a plurality of point spread functions in correspondence to various distances, it is not absolutely necessary to detect the two-dimensional distance distribution.

For instance, only the distance to the object constituting the main subject may be measured and a point spread function corresponding to the distance may be prepared. In this case, the overall image is repaired by using point spread function thus prepared. Since this structure only requires an inexpensive and simple distance detection device instead of a distance detection device capable of detecting the two-dimensional distance distribution, the image repair apparatus can be more readily included in a digital still camera or the like. In addition, since the image of an object present at a distance different from the distance of the main subject is already blurred due to defocusing, executing an image repair based upon the distance to the main subject alone itself does not pose a serious problem.

While an explanation has been given above on the assumption that an image blur occurs due to an angular displacement of the photographic optical system, a parallel displacement (a movement through which the photographic optical system shifts parallel to the optical axis) of the photographing optical system also greatly affects the image quality in a close-up photographing operation. In such a case, an acceleration sensor for parallel movement detection may be utilized to detect a parallel blur signal so as to calculate a point spread function corresponding to the distance by using the parallel blur signal and the distance data.

Figure 17:
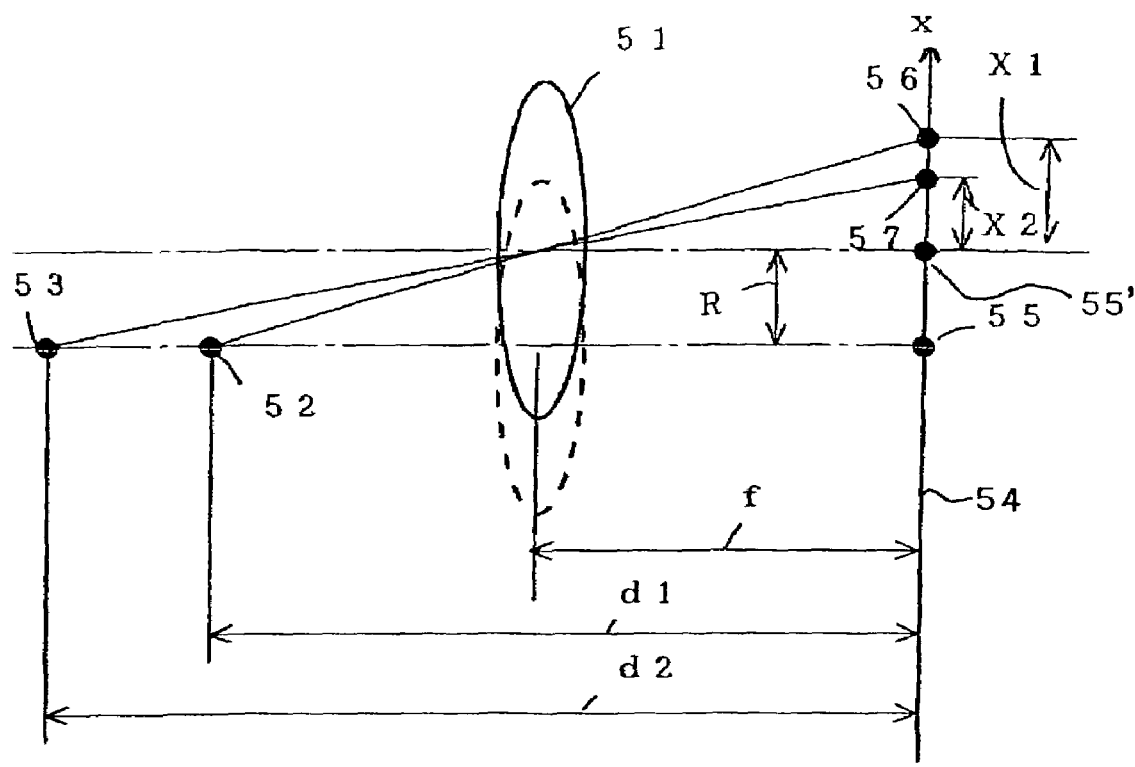
FIG. 17 illustrates the relationship between the parallel movement and the image blur manifesting in correspondence to the distance.

FIG. 17 illustrates the principle of the conversion of parallel blur signal to an image blur signal, which is executed in correspondence to the distance. The same reference numerals are assigned to components identical to those shown in FIG. 11. Let us now consider a situation in which the lens 51 has shifted by a distance R parallel to the optical axis along the x axis. As the lens 51 shifts by the distance R along the x axis, the image plane center 55, too, shifts. Reference numeral 55' indicates the image plane center after the shift.

It is assumed that the extent of blurring of the image at the points 52 and 53 set on the optical axis over the distances d1 and d2, which manifests along the x axis of the image plane are equal to the distances X1 and X2 of the image points 56 and 57 corresponding to the points 52 and 53 from the image plane center 55'. The extents of image blurring X1 and X2 for the points 52 and 53 respectively, manifesting along the x axis of the image plane are determined as indicated through the formulae in (expression 7)

$$X1 = f \times R/(d1-f)$$

$$X2 = f \times R/(d2-f) \quad \text{(expression 7)}$$

It is to be noted that the image blurring extents Y1 and Y2 along the y axis, too, can be calculated through a similar process.

As (expression 7) indicates, the extent of blurring attributable to a parallel movement increases drastically in a close-up photographing operation as the distance d becomes closer to the focal length f.

Through a conversion performed in conformance to the conversion formulae in (expression 7), the parallel movement is converted to an image blur corresponding to the distance and thus, a point spread function can be calculated in correspondence to the image blur. Then, the blurred image is repaired by using the point spread function thus obtained. As a result, it becomes possible to repair an image having become degraded due to an image blur caused by a parallel movement in correspondence to the distance.

In the variation of the embodiment described above, an image having become blurred during a close-up photographing operation can be successfully repaired.

In addition, an even more effective image repair can be achieved by combining the image repair of a blur caused by a parallel movement and the image repair of a blur caused by an angular movement described above. In this case, the angular speed sensors for detecting an angular movement and an acceleration sensor for detecting a parallel movement should be utilized. Then, the extent of image blurring attributable to the angular movement, which are calculated through the formulae in (expression 2) and the extent of image blurring attributable to the parallel movement, which are calculated through the formulae in (expression 7) are individually synthesized. A synthesized image blurring extent Xt along the x axis is expressed as in (expression 8) below.

$$Xt = K \times Xa + L \times Xp (0 < K < 1, 0 < L < 1) \quad \text{(expression 8)}$$

In the above expression, Xa represents the extent of image blurring attributable to the angular movement manifesting along the x axis and Xp represents the extent of image blurring attributable to the parallel movement manifesting along the x axis. K and L represent coefficients by which Xa and Xp are respectively multiplied.

By comparing the image blurring extent Xa attributable to the angular movement and the image blurring extent Xp attributable to the parallel movement, K is set larger than L if Xa>Xp. If Xa<Xp, on the other hand, K is set smaller than L. In other words, if the image blurring extent Xa attributable to the angular movement is larger than the image blurring the extent Xp attributable to the parallel movement, the ratio of Xa is increased. If, on the other hand, the image blurring extent Xp attributable to the parallel movement is larger than the image blurring extent Xa attributable to the angular movement, the ratio of Xp is increased. As a result, the image can be repaired by taking into consideration both the angular movement and the parallel movement.

(expression 2) and (expression 7) used to convert an angular movement and a parallel movement to image blurring extents on the image plane may be corrected in correspondence to the distance by which the lens has been driven or the photographing magnification factor if the photographic lens is driven out over a large distance during close-up photographing causing the focal length f to change greatly in correspondence to the distance over which the photographic lens has been driven. In addition, while angular speed sensors are utilized as blur detection sensors in the embodiment described earlier, the present invention is not limited to this example and an acceleration sensor or image sensors, which detects an image blur by detecting the movement of the image over time, may be utilized instead.

While a passive trigonometric distance detection (trigonometric range measurement) device is used as the distance sensor in the embodiment described earlier, the present invention is not limited to this example. The distance distribution may instead be measured by scanning the subject with a so-called active trigonometric range finding device. Such an active trigonometric range finding device may emit a light beam toward the subject along a specific optical axis and may detect the distance by measuring the image forming position at which the reflected light beam is formed with an optical system distanced from the light beam by a baseline length. Alternatively, the distance distribution of the subject may be detected by emitting an electromagnetic wave or a sonic wave and measuring the length of time elapsing before the wave reflected by the subject returns. In this case, highly accurate distance measurement is achieved even when the subject is relatively dark.

In addition, the blurred image repair processing is automatically executed in the digital still camera in response to a shutter release signal in the embodiment. However, the distance information or the distance distribution information, the blur information and the image signal may be temporarily stored into a recording medium so as to allow the digital camera to repair the blurred image later by reading out the distance information or the distance distribution information, the blur information and the image signal from the recording medium. This alternative, which allows the blurred image repair processing to be executed when the onus on the digital still camera is relatively small, is particularly advantageous when the camera is used in a continuous shooting operation.

The distance information or the distance distribution information, the blur information and the image signal may be temporarily stored into a recording medium so that the blurred image can be repaired later on a personal computer or the like by reading out the distance information or the distance distribution information, the blur information and the image signal from the recording medium of the personal computer. This lessens the onus placed on the digital still camera and, at the same time, image processing which involves larger-scale arithmetic operations is enabled. Moreover, the quality of the repaired image improves.

Silver halide film may be used as the recording medium instead of a memory card. For instance, an image may be optically recorded onto silver halide film having a magnetic layer where distance information or distance distribution information and blur information are magnetically recorded. Then, the image signal should be extracted into a personal computer by reading the silver halide film with a scanner or the like. Alternatively, the distance information or the distance distribution information recorded in the magnetic layer may be read by using a magnetic head. The image repair according to the present invention can be adopted in a photographing system that uses silver halide film in this manner, as well as in a digital still camera.

In addition, while the processing for repairing a blurred image is automatically executed in the embodiment explained earlier, the processing for dividing the image plane into a plurality of portions in correspondence to the various distance zones, for instance, may be executed interactively in response to an operating input by the photographer while the image is displayed on a display unit or the like. In such a case, the blurred image can be repaired by reflecting the intent of the photographer. In addition, the blurred image repair can be executed in a reliable manner even when the automatic processing cannot be performed easily.

In the embodiment described above, the blurred image repair processing is executed on the image over all the distance zones. However, since the image of a subject in a distance zone that does not match the distance setting at photographing optical system is already blurred due to defocusing, the blurred image repair processing on the image in this distance zone may be omitted. For instance, the defocusing extent calculated based upon the distance setting information indicating the distance setting at the photographing optical system and the aperture value information should be compared with the image blurring extent in a specific distance zone. If the defocusing extent is predominant, the blurred image repair processing is not executed on the image in this distance zone. As a result, a high-response image repair apparatus can be realized by reducing the length of time required for the image processing.

In addition, while the blurred image repair processing is executed each time a shutter release signal is input through the shutter release button in the embodiment, the blurred image repair processing may instead be executed when a specific operating mode (e.g., a close-up photographing mode for performing a camera operation suitable for close-up shooting or a high definition recording mode in which a low compression rate is set for image recording) is set in the digital still camera, or when the distance setting at the photographing optical system is smaller than a predetermined distance. Since this allows the blurred image repair processing to be automatically executed only when it is essential to repair the blurred image, a high response photographing operation is enabled under normal circumstances.

As explained above, in the image generating apparatus and the image generating method according to the present invention, the distances or the distance distribution of the subject on the image plane is detected and blurred image repair processing is executed by using the optimal point spread functions corresponding to the distance or the distance distribution. As a result, the blurred image can be repaired more successfully compared to blurred image repair processing executed by using a uniform point spread function regardless of variations in the subject distance. The present invention and is particularly effective in application for repairing a blur in a close-up image, the quality of which is greatly affected by an unsteady hand movement.

Moreover, blurs are repaired in an image that contains a plurality of subjects present over varying distances within the image plane by first repairing the blurred partial images corresponding to the various distances and then synthesizing them to create a whole repaired image, an effective blur repair can be achieved.

The invention claimed is:

1. An image generating apparatus comprising:
    an image-capturing unit that captures an image of a subject formed on an image plane by a photographing optical system and generates an image signal;
    a distance detection unit that detects two-dimensional distance distribution of the subject, divides the subject distance into a plurality of distance zones based upon distance distribution information and calculates a plurality of sets of distance data each representing one of the distance zones;
    a vibration detection sensor that detects in real time a vibration occurring during the image-capturing operation at the photographing optical system and generates a vibration signal;
    an image blur extent calculation unit that calculates an extent of image blur manifesting in the image plane based upon the vibration signal and the distance distribution information, with the extent of image blur increasing as the distance becomes shorter;
    a point spread function generating unit that generates a plurality of point spread functions each corresponding to one of said plurality of sets of distance data based upon the extent of image blur; and
    an image repair unit that divides the image signal into a plurality of partial images each corresponding to one of the distance zones, forms a plurality of repaired partial images by repairing the partial images with the point spread functions each corresponding to one set of distance data and forms a repaired image by synthesizing said plurality of repaired partial images.

2. An image generating apparatus comprising:
    an image-capturing unit that captures an image of a subject formed on an image plane by a photographing optical system and generates an image signal;
    a distance detection unit that detects a distance of the subject on the image plane and generates distance information;
    a vibration detection sensor that detects in real time a vibration occurring at the photographing optical system during the image-capturing operation and generates a vibration signal;
    an image blur extent calculation unit that calculates an extent of image blur caused by the vibration manifesting in the image plane based upon the vibration signal and the distance information, with the extent of image blur increasing as the distance becomes shorter;
    a point spread function generating unit that generates a point spread function corresponding to the distance based upon the extent of image blur; and
    an image repair unit that forms a renaired image by repairing the image signal using the point snread function, wherein:
    the vibration detection sensor detects an angular movement through which the photographing optical system becomes displaced around two axes each extending perpendicular to an optical axis of the photographing optical system, and
    the image blur extent calculation unit calculates an extent of image blur along an X axis and an extent of image blur along a Y axis for using the following equations:

$X = d \times f \times \tan \theta Y / (d-f)$ $Y = d \times f \times \tan \theta X / (d-f)$ wherein X represents an extent of image blur along the X axis, Y represents an extent of image blur along the Y axis, d represents the distance, f represents a focal length, θY represents an angular movement around the Y axis, and θX represents an angular movement around the X axis.

3. An image generating apparatus comprising:
an image-capturing unit that captures an image of a subject formed on an image plane by a ohoto graphing optical system and generates an image signal;
a distance detection unit that detects a distance of the subject on the image plane and generates distance information;
a vibration detection sensor that detects in real time a vibration occurring at the photographing optical system during the image-capturing operation and generates a vibration signal;
an image blur extent calculation unit that calculates an extent of image blur caused by the vibration manifesting in the image plane based upon the vibration signal and the distance information, with the extent of image blur increasing as the distance becomes shorter;
a point snread function generating unit that generates a point spread function corresponding to the distance based upon the extent of image blur; and
an image repair unit that forms a repaired image by repairing the image signal using the point spread function, wherein:
the vibration detection sensor detects a parallel movement through which the photographing optical system becomes shifted parallel to an optical axis of the photographing optical system, and
the image blur extent calculation unit calculates an extent of image blur along an X axis and an extent of image blur along a Y axis by using the following equations:

$$X = f \times RX/(d-f)$$

$$Y = f \times RY/(d-f)$$

wherein X represents an extent of image blur along the X axis, Y represents an extent of image blur along the Y axis, d represents the distance, f represents a focal length, RX represents a parallel movement along the X axis, and RY represents a parallel movement along the Y axis.

4. An image generating apparatus comprising:
an image-capturing unit that captures an image of a subject formed on an image plane by a photographing optical system and generates an image sianal;
a distance detection unit that detects a distance of the subject on the image plane and generates distance information;
a vibration detection sensor that detects in real time a vibration occurring at the photographing optical system during the image-capturing operation and generates a vibration signal;
an image blur extent calculation unit that calculates an extent of image blur caused by the vibration manifesting in the image plane based upon the vibration signal and the distance information, with the extent of image blur increasing as the distance becomes shorter;
a point spread function generating unit that generates a point spread function corresponding to the distance based upon the extent of image blur; and
an image repair unit that forms a repaired image by repairing the image signal using the point spread function, wherein:
the vibration detection sensor detects an angular movement through which the photographing optical system becomes displaced around two axes each extending perpendicular to an optical axis of the photographing optical system and a parallel movement through which the photographing optical system becomes shifted parallel to the optical axis to generate the vibration signal based upon the anaular movement and the parallel movement, and
the image blur extent calculation unit calculates (a) an extent Xa of image blur along an X axis and an extent Ya of image blur along a Y axis attributable to the angular movement, (b) an extent Xp of image blur along the X axis and an extent Yp of image blur along the Y axis attributable to the parallel movement, and (c) a synthesized extent Xt of image blur along the X axis and a synthesized extent Yt of image blur along the Y axis by using the following equations:

$$Xa = d \times f \times \tan \theta Y/(d-f)$$

$$Ya = d \times f \times \tan \theta X/(d-f)$$

wherein d represents the distance, f represents a focal length, θY represents an angular movement around the Y axis, and θX represents an angular movement around the X axis;

$$Xp = f \times RX/(d-f)$$

$$Yp = f \times RY/(d-f)$$

wherein RX represents a parallel movement along the X axis, and RY represents a parallel movement along the Y axis; and $$Xt = K \times Xa + L \times Xp$$

$$Yt = K \times Ya + L \times Yp$$

wherein K represents a coefficient by which Xa and Ya are multiplied, and L represents a coefficient by which Xp and Yp are multiplied.

* * * * *